US009341476B2

(12) United States Patent
Townsend et al.

(10) Patent No.: US 9,341,476 B2
(45) Date of Patent: May 17, 2016

(54) RATE SENSOR WITH QUADRATURE REJECTION

(75) Inventors: Kevin Townsend, Plymouth (GB); Michael Durston, Plymouth (GB)

(73) Assignee: SILICON SENSING SYSTEMS LIMITED (GB)

(*) Notice: Subject to any disclaimer, the term of this patent is extended or adjusted under 35 U.S.C. 154(b) by 439 days.

(21) Appl. No.: 13/698,339

(22) PCT Filed: May 13, 2011

(86) PCT No.: PCT/GB2011/000728
§ 371 (c)(1),
(2), (4) Date: Jan. 29, 2013

(87) PCT Pub. No.: WO2011/144890
PCT Pub. Date: Nov. 24, 2011

(65) Prior Publication Data
US 2013/0199294 A1 Aug. 8, 2013

(30) Foreign Application Priority Data
May 17, 2010 (GB) .................................. 1008195.8

(51) Int. Cl.
G01C 19/56 (2012.01)
G01C 19/5677 (2012.01)
G01C 19/5776 (2012.01)

(52) U.S. Cl.
CPC ............ G01C 19/56 (2013.01); G01C 19/5677 (2013.01); G01C 19/5776 (2013.01)

(58) Field of Classification Search
CPC ............... G01C 19/56; G01C 19/5677; G01C 19/5776; G01C 21/16; G01C 21/18; G01P 3/489; G01P 3/44
See application file for complete search history.

(56) References Cited

U.S. PATENT DOCUMENTS 5,218,867 A * 6/1993 Varnham et al. ............ 73/504.13
5,566,093 A * 10/1996 White .......................... 702/190
(Continued)

FOREIGN PATENT DOCUMENTS

CN 1692270 A 11/2005
CN 101014830 A 8/2007
(Continued)

OTHER PUBLICATIONS

International Search Report for International Application No. PCT/GB2011/000728 dated Aug. 29, 2011.
(Continued)

Primary Examiner — Peter Macchiarolo
Assistant Examiner — Anthony W Megna Fuentes
(74) Attorney, Agent, or Firm — Cantor Colburn LLP

(57) ABSTRACT

An inertial sensor is described that has means for improving quadrature rejection The sensor is of a ring type, driven by a driver circuit, the sensor further comprising primary and secondary portions having corresponding signal pickoffs. The primary pickoff signal amplitude is controlled via an automatic gain control, the primary phase lock loop and VCO locks to the resonant frequency to provide the clocks for the synchronous detectors, the primary pickoff signals via the primary phase shift circuit is provided to the primary driver, the secondary pickoff signal being input into a detector circuit capable of detecting motion in the sensor. The secondary channel comprises a series of circuits that when operable in series significantly improve the quadrature rejection ability of the sensor. The circuits include a synchronous detector, passive and active filters and a decimator.

14 Claims, 1 Drawing Sheet

(56) References Cited

U.S. PATENT DOCUMENTS

| | | | |
|---|---|---|---|
| 7,216,538 B2 * | 5/2007 | Ito et al. .................. | 73/504.12 |
| 8,061,201 B2 | 11/2011 | Ayazi et al. | |
| 2001/0022107 A1 * | 9/2001 | Kato et al. .............. | 73/504.12 |
| 2002/0113586 A1 * | 8/2002 | Ho et al. ................. | 324/76.29 |
| 2003/0056588 A1 | 3/2003 | Fell et al. | |
| 2004/0026720 A1 * | 2/2004 | Schiller .................. | 257/226 |
| 2006/0016260 A1 * | 1/2006 | Smith ..................... | 73/504.03 |
| 2006/0260382 A1 | 11/2006 | Fell et al. | |
| 2007/0240508 A1 * | 10/2007 | Watson ................... | 73/504.12 |
| 2009/0235742 A1 * | 9/2009 | Matsumoto et al. ...... | 73/504.12 |

FOREIGN PATENT DOCUMENTS

| | | |
|---|---|---|
| EP | 0461761 | 12/1991 |
| EP | 0461761 A1 | 12/1991 |
| EP | 1359391 A3 | 11/2003 |
| EP | 1788351 | 5/2007 |
| EP | 1788351 A1 | 5/2007 |
| GB | 2322196 | 8/1998 |
| JP | 63094718 A | 4/1988 |
| JP | S63318623 A | 12/1988 |
| JP | 2007146151 A | 6/2007 |
| JP | 2007520716 A | 7/2007 |
| JP | 2007327943 A | 12/2007 |
| JP | 2008507713 A | 3/2008 |
| JP | 2008122122 A | 5/2008 |
| JP | 2008256668 A * | 10/2008 |
| JP | 2010096765 A | 4/2010 |
| WO | 2008072008 A1 | 6/2008 |

OTHER PUBLICATIONS

English Translation of Japanese Office Action for related Japanese Patent Application No. 2013-510668, 10 pages, mailed: Jan. 27, 2015.

International Search Report for realted International Application No. PCT/GB2011/000728, Dated: Aug. 18, 2011; 3 pages.

Office Action for related Chinese Application No. 201180024745.6; Dated: Nov. 4, 2014; 18 pages.

Written Opinion of related International Application No. PCT/GB2011/000728, International filed: May 13, 2011, 4 pages.

\* cited by examiner

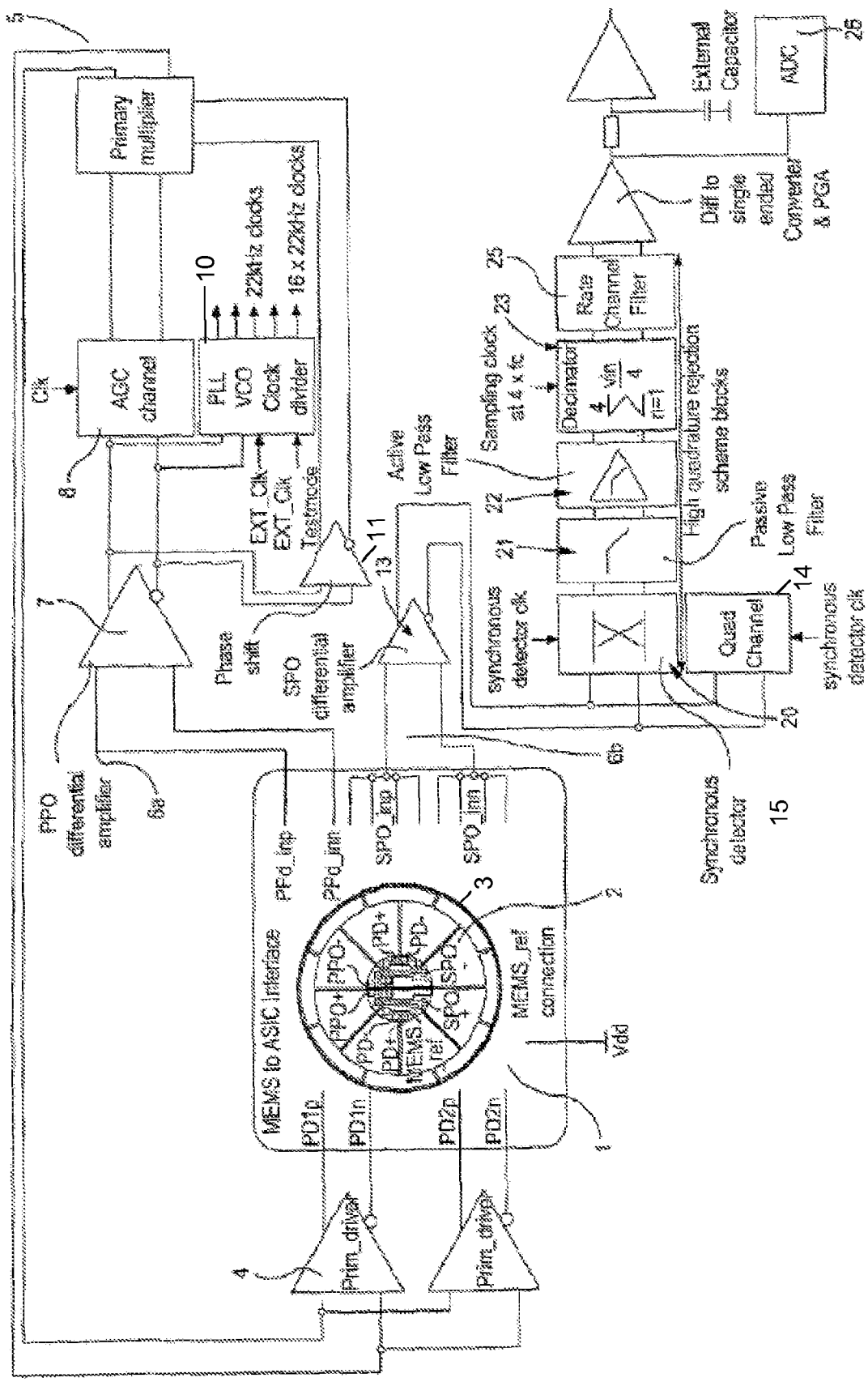

RATE SENSOR WITH QUADRATURE REJECTION

CROSS REFERENCE TO RELATED APPLICATION

The present application is the U.S. national stage application of International Application PCT/GB2011/000728, filed May 13, 2011, which international application was published on Nov. 24, 2011, as International Publication WO 2011/144890. The International Application claims priority of British Patent Application 1008195.8, filed May 17, 2010, the contents of which are incorporated herein by reference in their entireties.

The invention relates to sensors. More specifically but not exclusively it relates to sensors such as inertial sensors, for example accelerometers and gyroscopes capable of high levels of quadrature rejection to minimise errors in signal channels of such sensors.

Many types of inertial sensors are known. Angular velocity sensors incorporating a MEMS type ring are known and such examples can be seen in, for example, GB2322196. In such angular velocity sensors a vibrating planar ring or hoop-like structure is disclosed. The ring-like structure is suspended in space by a suitable support mount for detecting turning rate, linear acceleration and angular acceleration. Turning rate is sensed by detecting vibrations coupled by Coriolis forces, whereas linear acceleration and angular acceleration are sensed by lateral, vertical and rocking movement of the entire ring or hoop-like structure within its mount.

High levels of quadrature bias, >1000°/s, which is at 90° to the required rate signal (<1°/s) may be present in mechanical MEMS gyroscopes and is not easily reduced without expensive mechanical trimming. This requires the secondary channel of the MEMS gyroscope to have high levels of quadrature rejection, in the order of or greater than 60 dB, which is equivalent to a phase accuracy of the demodulator of <0.05°. Additionally, due to the high levels of undesirable quadrature signals, the demodulator circuit within the secondary channel is subject to high levels of significantly fast changes in voltage over a very short period of time (dv/dt).

In order to solve these issues and to produce an accurate system, the use of high performance circuits, very accurate phase, high bandwidth and fast slew rates is required. This can increase the cost and size of the sensor.

According to the invention there is provided an angular velocity sensor comprising a ring type sensor having primary and secondary elements, the sensor further comprising primary and secondary channels connected to said primary and secondary elements, the primary channel comprising primary driver means for initiating and maintaining resonant oscillations in the primary elements, the secondary channel comprising detector means for detecting signals generated by the secondary elements in response to movement of the sensor, the detecting means including a differential amplifier and synchronous detectors generating an output signal dependent upon the movement of the sensor, wherein the secondary channel further comprises means for improving quadrature rejection in the secondary channel signal, said means comprising a series of circuits including a synchronous detector, passive and active filters and a decimator, said output signal being passed through the series of circuits and thereby suppressing high levels of quadrature signals.

According to the invention there is further provided a method of reducing quadrature rejection in the secondary channel signal of a MEMS angular velocity sensor comprising the steps of detecting the signal using a synchronous detector; filtering the signal using passive filtering means; filtering the signal using active filtering means; decimating the signal so as to suppress any remaining quadrature component of the signal; and averaging offset from the output of the active filter.

In this way, the secondary channel signal is modified to include a number of stages that combine to provide overall in the region of 88 dB of suppression, although different levels of suppression may be achieved by suitable variation of the stages. Additionally, the architecture utilised is designed to minimise the required performance of the various stages, reducing the required phase accuracy, reducing the required bandwidth, reducing the required slew rates and therefore reducing the current consumption. In this way a sensor having high levels of quadrature rejection is produced using relatively low performance circuitry.

The invention will now be described with reference to the accompanying diagrammatic drawings in which:

FIG. 1 is a schematic drawing of an angular sensor in accordance with one form of the invention including circuitry capable of reducing high levels of quadrature rejection.

As shown in FIG. 1, the MEMS ring structure of the angular velocity sensor comprises inner 2 and outer 3 peripheries extending around a common axis, the drives and pickoffs operating differentially. Piezoelectric primary drive means 4 are provided that cause the sensor to vibrate on supports (not shown). The supports may include a plurality of flexible support beams (not shown) for supporting the sensor and for allowing it to vibrate in response to the piezoelectric primary drive means input in a substantially undamped oscillation mode. This enables the resonator to move relative to the support means in response to turning rate of the system including the sensor.

A detecting circuit 5 is provided to which a series of signals 6 are input from the sensor. The signals output by the sensor include primary pickoff signals 6a and secondary pickoff signals 6b and the transducer plates are arranged such that the signals are of a differential form. These signals are output from primary and secondary portions of the sensor. The primary pickoff differential transducer signal is input to a differential charge amplifier (primary pickoff amplifier) 7 which provides a high level of gain to provide a low noise differential sinusoidal output signal at the carrier frequency. This signal is then passed through a synchronous detector 8 and suitable filtering to provide a control signal to the primary driver circuit 1 to set the level of the drive applied to the MEMS to ensure the primary pickoff amplifier output is on a controlled fixed level. The output of the primary pickoff amplifier 7 is also applied to the primary phase lock loop (PLL) and voltage controlled oscillator (VCO) 10 which locks the frequency of the ring to its natural primary resonance frequency to provide clocks for the synchronous detectors 8. The output of the primary pickoff amplifier 7 is also applied to the primary phase shift circuit 11 which amplifies the signal by a factor of two and shifts the phase of the differential signal by 90°. The output of the phase shift circuit 11 is applied to the primary driver circuit 1 which multiplies the differential sinusoidal output of the phase shift circuit 11 by the AGC control signal to generate the differential MEMS driver waveforms.

The outputs of the secondary portions of the sensor 6b are input to a secondary pickoff amplifier 13. The outputs of the secondary pickoff amplifier 13 are then connected to the inputs of two synchronous detectors 14, 15. The quadrature channel synchronous detector 14 is used to generate a base band voltage proportional to the amount of quadrature signal. The signal (rate) channel synchronous detector 15 is used in combination with a set of series circuits; namely discrete functional blocks that process the signal sequentially to generate a base band signal that is proportional to the rate signal such that the combination of the functional blocks rejects the high level of quadrature signal on the output of the pickoff amplifier.

The quadrature rejection circuitry comprises 4 stages;

Stage 1 is a synchronous detector 20 and uses a set of simple switches that ensure fast switching times and therefore accurate synchronous detection. Using simple switches with fast switching times ensures phase accurate synchronous detection and very low signal distortion while being very simple and using minimal supply current.

Stage 2 is a passive filter 21 and may be a simple first order RC low pass filter. This is required as the output of the synchronous detector contains large dv/dt discontinuities which are significantly reduced by the passive filter prior to being applied to further circuitry, for example an active filter 22. It can be difficult for an active filter to process a signal with large dv/dt discontinuities as the finite bandwidth and slew rates associated with active circuits would lead to an asymmetric time response and therefore significantly reduced quadrature rejection.

Stage 3 is an active filter 22 and may be a simple first order low pass filter. This filter 22 further attenuates any artefacts of the demodulation process and provides additional smoothing of the required dc signal level. An op-amp within the active filter 22 is chopped to suppress flicker noise and is arranged to be 45° after the demodulator clock to ensure it is not coincident with the sampling points.

Stage 4 is a decimator stage 23 which acts to suppress any remaining quadrature component of the signal typically by sampling the ripple generated by the quadrature signal and averaging this to zero and averaging the offset from the output of the active filter 22. The decimator 23 samples at four times the carrier frequency rate and averages these samples to provide an output at the carrier frequency rate. This suppresses any carrier frequency or twice carrier frequency components resulting from the demodulation and filtering stages and avoids sub-sampling these down to form dc offsets. Any remaining ripple generated by the quadrature signal is sampled and rejected by the decimation process.

The four stages will now be described in more detail.

In Stage 1, the input carrier frequency is demodulated using the correct phase clock signal using simple switches and outputs a full-wave rectified sine-wave which can be averaged to provide a dc signal. Any quadrature signal will generate a ripple signal with large dv/dt discontinuities on the demodulated output signal. This is passed through the passive filter 22, which starts to smooth the full-wave rectified sine-wave.

The demodulator and passive filter are placed before the active filter 22 as due to the very large quadrature signal the chopped sin wave from the demodulator has very large voltage discontinuities which makes it unsuitable as an input for many active circuits. The finite bandwidth and slew rates of active circuits would lead to asymmetric time response and significantly degrade the quadrature suppression. The use of the passive filter first converts these large voltage discontinuities to much smaller dv/dt discontinuities. The output of the passive filter then defines currents into the active low pass filter, which by its nature is able to reduce the discontinuities to even smaller gradients. The signals required from the op-amp are now very much in the small signal response region with only a few artefacts of the demodulation process reducing the required performance of the op-amp in the active filter. To further enhance the quadrature rejection the switches in the demodulator are designed to provide balance resistance around the mid rail voltage. The active filter 22 provides both additional smoothing of the required dc signal and low output impedance for interfacing to the following circuits. The op-amp in the active filter is also chopped to suppress flicker noise of this stage and is arranged to be 45° after the demodulator clocks to ensure that the chopping does not occur at the sampling points.

The output of the active filter 22 is then passed into a decimator 23 which enhances the quadrature suppression by sampling the ripple generated by the quadrature signal and averaging this to zero and averages the offset from the output of the active filter 22.

The decimator samples at four times the carrier frequency and provides an average output at the carrier frequency rate. The demodulated signal contains frequencies that are twice the carrier frequency and therefore have to be sampled at twice the highest frequency to avoid aliasing. It will be appreciated that other multiplication factor above 4 would work (8, 16 etc) but would add further delays and complexity Using this method suppresses any carrier frequency or twice carrier frequency components resulting from the demodulator and filtering stages and avoids sub-sampling these down to form dc offsets. It also zeros any remaining quadrature signal and averages the inputs offsets of the previous stages as they appear as a chopped offset.

In this manner, very high suppression of large quadrature signals is achieved. Additionally, there are reduced performance requirements for active circuits, lower gain bandwidth, slew rates and power consumption.

The output of stage 4 of the quadrature rejection stages is input to a rate channel programme gain amplifier and output buffer stage 25 and subsequently output to an A to D converter 26 to produce the required signal dependent on the movement of the sensor.

It will be appreciated that the scheme described above may be used where the output for the MEMS transducers are not differential. The order of the stages described may be varied but the order described has been found to minimise the circuit requirements and achieve optimum quadrature rejection.

It will be appreciated that although the invention is described with reference to an angular velocity sensor of the type described above, it may equally be applied to a sensor such as a piezo ring case, the same applying to other forms of transduction such as piezo, capacitive, inductive.

It will further be appreciated that the inner and outer electrodes only relate to the piezo. Anti phase signals can be obtained from 45 deg to 135 deg etc from non piezo pick offs, such as inductive or capacitive pickoffs.

The invention claimed is:

1. An angular velocity sensor comprising a ring type sensor having primary and secondary elements, the sensor further comprising primary and secondary channels connected to said primary and secondary elements, the primary channel comprising primary driver means for initiating and maintaining resonant oscillations in the primary elements, the secondary channel comprising detecting means for detecting signals generated by the secondary elements in response to a movement of the sensor, the detecting means including a differential amplifier and synchronous detectors generating an output signal dependent upon the movement of the sensor, wherein the secondary channel further comprises means for improving quadrature rejection in the secondary channel signal, said means comprising a series of circuits including a synchronous detector, passive and active filters and a decimator, said output signal being passed through the series of circuits and thereby suppressing high levels of quadrature signals, wherein the decimator samples at a frequency of four times a carrier frequency of the secondary channel signal.

2. The angular velocity sensor according to claim 1 in which the series of circuits includes a first stage comprising a synchronous detector.

3. The angular velocity sensor according to claim 1 in which the series of circuits further includes a second stage comprising a passive low pass filter to remove fast edges of demodulated waveforms.

4. The angular velocity sensor according to claim 1 in which the series of circuits further includes a third stage comprising an active low pass filter to further reduce ripple due to demodulation of input waveforms.

5. The angular velocity sensor according to claim 1 in which the series of circuits further includes a fourth stage comprising the decimator to reject remaining components of quadrature signal.

6. The angular velocity sensor according to claim 1, in which the primary elements comprise pick off and drive transducers at 0, 90, 180 and 270 degrees on the ring and the secondary elements comprise 45, 135, 225 and 315 degrees.

7. The angular velocity sensor according to claim 6 in which signals generated by the 45 and 225 degree elements on the ring are anti phase to the signals at 135 and 315 degrees.

8. The angular velocity sensor according to claim 1 in which the elements are piezo electrodes.

9. The angular velocity sensor according to claim 1 in which the signals applied to the secondary channel differential amplifier are respectively 180 degrees out of phase.

10. The angular velocity sensor according to claim 1 in which the primary channel includes a synchronous detector receiving a signal from a primary pick off on the ring, the primary pick off on the ring feeds back to a primary drive, and is controlled in amplitude by an AGC, thereby enabling closed loop operation of the primary channel.

11. The angular velocity sensor according to claim 1 in which the secondary channel operates in an open loop manner, thereby requiring no feedback.

12. The angular velocity sensor according to claim 1 in which the primary channel further comprises a phase locked loop to control a frequency of the primary channel by means of a VCO.

13. A method of reducing quadrature rejection in a secondary channel signal of a MEMS angular velocity sensor comprising the steps of detecting a signal using a synchronous detector; filtering the signal using passive filtering means; filtering the signal using an active filtering means; decimating the signal at a frequency of four times a carrier frequency of the signal so as to suppress any remaining quadrature component of the signal; and averaging offset from an output of the active filtering means.

14. An angular velocity sensor comprising a ring type sensor having primary and secondary elements, the sensor further comprising primary and secondary channels connected to said primary and secondary elements, the primary channel comprising primary driver means for initiating and maintaining resonant oscillations in the primary elements, the secondary channel comprising detecting means for detecting signals generated by the secondary elements in response to a movement of the sensor, the detecting means including a differential amplifier and synchronous detectors generating an output signal dependent upon the movement of the sensor, wherein the secondary channel further comprises means for improving quadrature rejection in the secondary channel signal, said means comprising a series of circuits including a synchronous detector, passive and active filters and a decimator, said output signal being passed through the series of circuits and thereby suppressing high levels of quadrature signals.

* * * * *